(12) United States Patent
Syed et al.

(10) Patent No.: US 9,105,981 B2
(45) Date of Patent: Aug. 11, 2015

(54) DIELECTRIC LENS CONE RADIATOR SUB-REFLECTOR ASSEMBLY

(75) Inventors: Junaid ul Islam Syed, Kirkcaldy (GB); Ronald J. Brandau, Homer Glen, IL (US); Alastair D. Wright, Edinburgh (GB); Allan Tasker, Kirkcaldy (GB); Brian J. Lawson, Leven (GB)

(73) Assignee: CommScope Technologies LLC, Hickory, NC (US)

( * ) Notice: Subject to any disclaimer, the term of this patent is extended or adjusted under 35 U.S.C. 154(b) by 489 days.

(21) Appl. No.: 13/448,995

(22) Filed: Apr. 17, 2012

(65) Prior Publication Data

US 2013/0271348 A1    Oct. 17, 2013

(51) Int. Cl.
*H01Q 15/02*    (2006.01)
*H01Q 19/08*    (2006.01)
*B29C 45/00*    (2006.01)
*H01Q 19/13*    (2006.01)
*H01Q 19/19*    (2006.01)

(52) U.S. Cl.
CPC ............ *H01Q 19/08* (2013.01); *B29C 45/0025* (2013.01); *H01Q 19/134* (2013.01); *H01Q 19/193* (2013.01)

(58) Field of Classification Search
USPC ...................... 343/781 CA, 781 P, 911 R, 781
See application file for complete search history.

(56) References Cited

U.S. PATENT DOCUMENTS

| | | | |
|---|---|---|---|
| 2,605,416 A | 7/1952 | Foster | |
| 4,673,945 A | 6/1987 | Syrigos | |
| 4,673,947 A | 6/1987 | Newham | |
| 4,963,878 A | 10/1990 | Kildal | |
| 5,959,590 A | 9/1999 | Sanford et al. | |
| 5,973,652 A | 10/1999 | Sanford et al. | |
| 6,020,859 A * | 2/2000 | Kildal | .................... 343/781 CA |
| 6,107,973 A | 8/2000 | Knop et al. | |
| 6,137,449 A | 10/2000 | Kildal | |
| 6,429,826 B2 | 8/2002 | Karlsson et al. | |
| 6,456,253 B1 | 9/2002 | Rummeli et al. | |
| 6,522,305 B2 | 2/2003 | Sharman | |
| 6,697,027 B2 | 2/2004 | Mahon | |

(Continued)

OTHER PUBLICATIONS

Sung Chul Kang, International Search Report—PCT of U.S. Appl. No. 13/448,995, filed Jun. 25, 2013, Daejeon Metropolitan City, Republic of Korea.

(Continued)

*Primary Examiner* — Hoang V Nguyen
*Assistant Examiner* — Hai Tran
(74) *Attorney, Agent, or Firm* — Babcock IP, PLLC (57) ABSTRACT

A dielectric cone radiator sub-reflector assembly for a reflector antenna with a waveguide supported sub-reflector is provided as a unitary dielectric block with a sub-reflector at a distal end. A waveguide transition portion of the dielectric block is dimensioned for insertion coupling into an end of the waveguide. A dielectric radiator portion is provided between the waveguide transition portion and a sub-reflector support portion. An outer diameter of the dielectric radiator portion is provided with a plurality of radially inward grooves extending radially inward to a diameter less than an inner diameter of the end of the waveguide and a lens bore extends from a proximal end of the dielectric block towards the distal end of the dielectric block at least to the sub-reflector support portion. The unitary dielectric block may be manufactured as a single contiguous monolithic portion of dielectric material via injection molding.

19 Claims, 6 Drawing Sheets

(56) References Cited

U.S. PATENT DOCUMENTS

| | | |
|---|---|---|
| 6,724,349 B1 | 4/2004 | Baird et al. |
| 6,862,000 B2 | 3/2005 | Desargant et al. |
| 6,919,855 B2 | 7/2005 | Hills |
| 6,985,120 B2 | 1/2006 | Lewry et al. |
| 6,995,727 B2 | 2/2006 | Tuau et al. |
| 7,023,394 B2 | 4/2006 | Mahr |
| 7,907,097 B2 * | 3/2011 | Syed et al. ............ 343/781 P |
| 2005/0062663 A1 * | 3/2005 | Hills ..................... 343/781 P |
| 2009/0021442 A1 | 1/2009 | Syed et al. |
| 2011/0309987 A1 | 12/2011 | Haluba et al. |

OTHER PUBLICATIONS

Kang Sung Chul, International Search Report for Related PCT application PCT/US13/36689, Sep. 23, 2013, Daejeon Metropolitan City, Korea.

* cited by examiner

DIELECTRIC LENS CONE RADIATOR SUB-REFLECTOR ASSEMBLY

BACKGROUND

1. Field of the Invention

This invention relates to a microwave dual reflector antenna. More particularly, the invention provides a self supported feed cone radiator for such antennas suitable for cost efficient manufacture via injection molding.

2. Description of Related Art

Dual reflector antennas employing self-supported feed direct a signal incident on the main reflector onto a sub-reflector mounted adjacent to the focal region of the main reflector, which in turn directs the signal into a waveguide transmission line typically via a feed horn or aperture to the first stage of a receiver. When the dual reflector antenna is used to transmit a signal, the signals travel from the last stage of the transmitter system, via the waveguide, to the feed aperture, sub-reflector, and main reflector to free space.

The electrical performance of a reflector antenna is typically characterized by its gain, radiation pattern, cross-polarization and return loss performance—efficient gain, radiation pattern and cross-polarizations characteristics are essential for efficient microwave link planning and coordination, whilst a good return loss is necessary for efficient radio operation.

These principal characteristics are determined by a feed system designed in conjunction with the main reflector profile.

Commonly owned U.S. Pat. No. 6,107,973, titled "Dual-Reflector Microwave Antenna" issued Aug. 22, 2000 demonstrates a feed assembly wherein a sub-reflector is supported by a dielectric funnel coupled to the end of a supporting waveguide. Functioning as a support structure only, the dielectric funnel becomes an impedance discontinuity that must be compensated for as the sub-reflector and reflector dish surface profiles and diameters, alone, are utilized to shape the RF path, resulting in an increased diameter of the sub-reflector and/or reflector dish. As the sub-reflector dimensions increase, RF signal path blockage by the sub-reflector along the boresight of the reflector antenna becomes significant. Further, an increased overall dimension of the resulting reflector antenna requires additional reinforcing structure considerations for both the reflector antenna and support structures the reflector antenna may be mounted upon.

Deep dish reflectors are reflector dishes wherein the ratio of the reflector focal length (F) to reflector diameter (D) is made less than or equal to 0.25 (as opposed to an F/D of 0.35 typically found in more conventional dish designs). An example of a dielectric cone feed sub-reflector assembly configured for use with a deep dish reflector is disclosed in commonly owned U.S. Pat. No. 6,919,855, titled "Tuned Perturbation Cone Feed for Reflector Antenna" issued Jul. 19, 2005 to Hills, hereby incorporated by reference in its entirety. U.S. Pat. No. 6,919,855 utilizes a dielectric block cone feed with a sub-reflector surface and a leading cone surface having a plurality of downward angled non-periodic perturbations concentric about a longitudinal axis of the dielectric block. However, the plurality of angled features and/or steps in the dielectric block requires complex machine tool manufacturing procedures which may increase the overall manufacturing cost.

Therefore it is the object of the invention to provide an apparatus that overcomes limitations in the prior art, and in so doing presents a solution that allows such a feed design to provide reflector antenna characteristics which meet the most stringent electrical specifications over the entire operating band used for a typical microwave communication link.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

The inventors have recognized that improvements in cone radiator sub-reflector assembly designs utilizing unitary dielectric blocks typically require manufacture of the dielectric block by machining, due to the increased size and complexity of these designs.

When injection molding and/or casting methods of manufacture are attempted on the prior dielectric block type cone radiator sub-reflector assembly designs, the increased size may create issues with the setting of the dielectric polymer material, such as voids, cracks, surface sink, dimensional bends and/or sagging. Further, where the designs utilize features that inhibit mold separation, such as overhanging and/or close proximity opposing edges, the required mold, if possible at all, may become too complex to be cost effective.

As shown in FIGS. 1-6, a cone radiator sub-reflector assembly 1 may be configured to couple with the end of a feed boom waveguide at a waveguide transition portion 5 of a unitary dielectric block 10 which supports a sub-reflector 15 at the distal end 20. The sub-reflector 15 and a supporting subreflector support portion 30 are provided with an enlarged diameter for reduction of sub-reflector spill-over.

A dielectric radiator portion 25 is situated between the waveguide transition portion 5 and the sub-reflector support portion 30. A plurality of corrugations are provided along the outer diameter of the dielectric radiator portion as radially inward grooves 35. In the present embodiments, the plurality of grooves is two grooves 35. A distal groove 40 of the dielectric radiator portion 25 may be provided with a distal sidewall 45 that initiates the sub-reflector support portion 30. To enable smooth mold separation, the grooves 40 may be provided with a taper that increases the groove width towards the outer diameter of the dielectric radiator portion 25.

The waveguide transition portion 5 of the sub-reflector assembly 1 may be adapted to match a desired circular waveguide internal diameter so that the sub-reflector assembly 1 may be fitted into and retained by the waveguide end that supports the sub-reflector assembly 1 within the dish reflector of the reflector antenna proximate a focal point of the dish reflector. The waveguide transition portion 5 may insert into the waveguide 3 until the end of the waveguide abuts a shoulder 55 of the waveguide transition portion 5.

The shoulder 55 may be dimensioned to space the dielectric radiator portion 25 away from the waveguide end.

One or more step(s) 60 at the proximal end 65 of the waveguide transition portion 5 may be applied to a lens bore 70 of the dielectric block 10 to form an inverted impedance transformer 75 for impedance matching purposes between the waveguide and the dielectric material of the dielectric block 10.

The lens bore 70 extends from the proximal end 65 of the dielectric block 10 towards the distal end 20 of the dielectric block 10 at least to the sub-reflector support portion 30. Thereby, a direct path between the waveguide 3 and the dielectric radiator portion 25 is formed, enabling tuning of the radiation pattern emitted therethrough, for example, via the depth applied to the grooves 35 and/or diameter of the dielectric radiator portion 25. Preferably, as best shown in FIGS. 3 and 6, the grooves 35 extend radially inward to a diameter less than an inner diameter of the end of the waveguide.

One skilled in the art will appreciate that the dielectric radiator portion 25, in combination with the lens bore 70 therethrough, creates a dielectric lens effect in which the dimensions of the dielectric radiator portion 25 enhances a primary radiation pattern projected through the dielectric radiator portion 25 to/from the sub-reflector 15 from/to the reflector dish that the sub reflector assembly 1 is mounted within, thereby assisting the shaping of the RF radiation pattern of the sub-reflector assembly 1 and reducing the diameter of sub-reflector 15.

Figure 4:
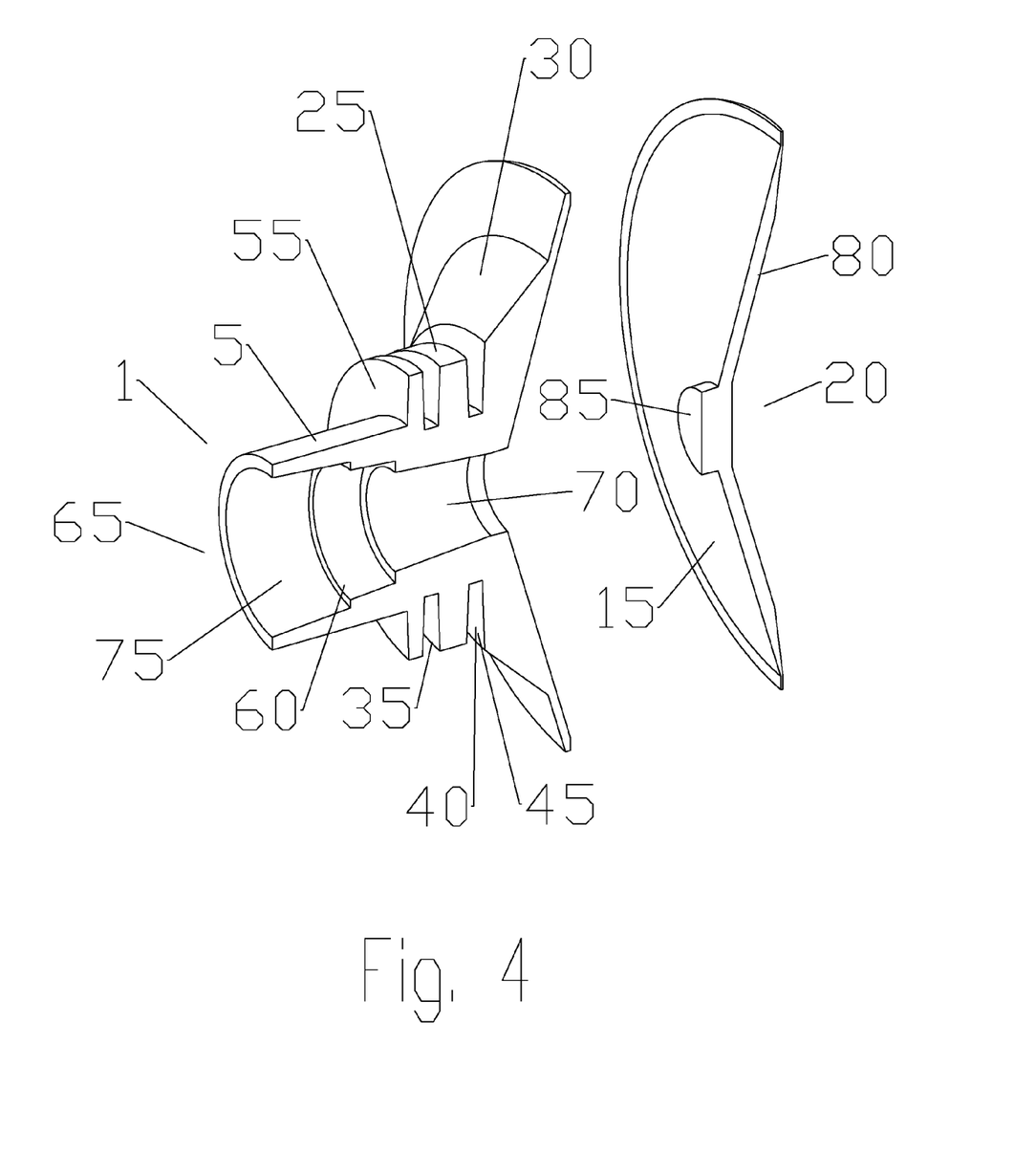
FIG. 4 is a schematic cross-section cut-away side isometric view of an alternative exemplary injection moldable dielectric cone radiator assembly, with a separate sub-reflector disc.
Figure 5:
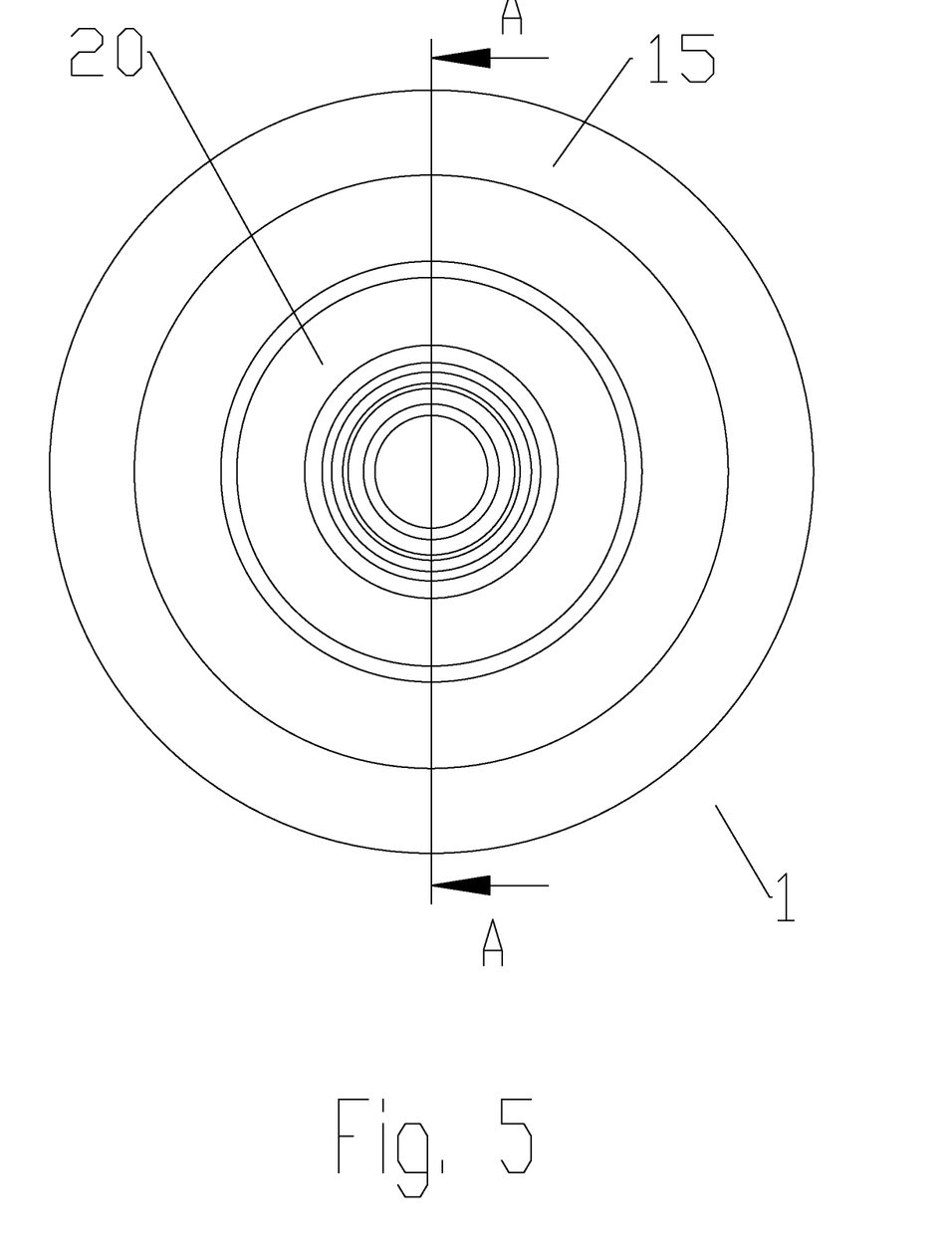
FIG. 5 is a schematic front view of the injection moldable dielectric cone radiator assembly of FIG. 4.
Figure 6:
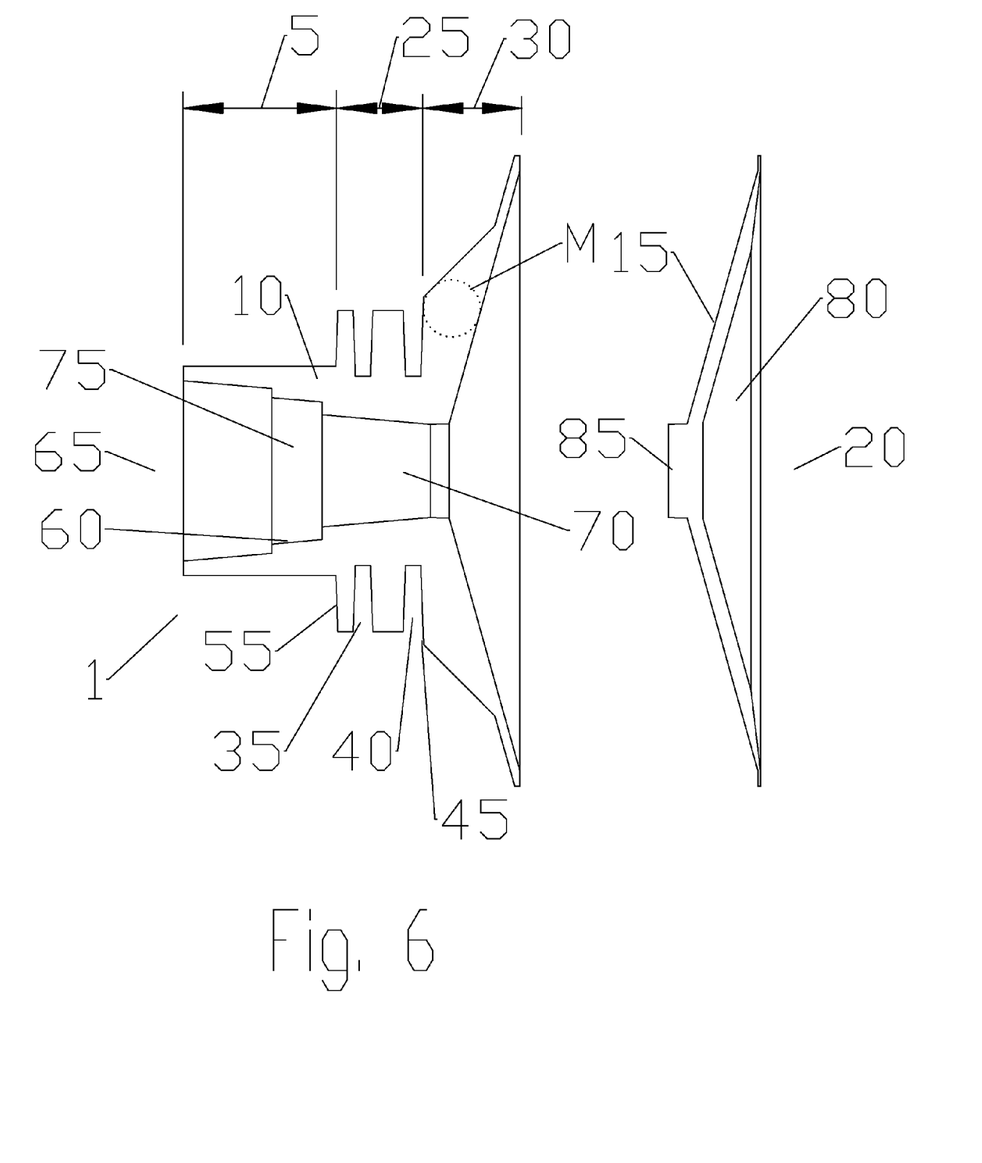
FIG. 6 is a schematic cut-away side view of the injection moldable dielectric cone radiator assembly of FIG. 4, taken along line A-A of FIG. 5.

As shown in FIGS. 4-6, the lens bore 70 may be provided extending entirely through the dielectric block 10, between the proximal end 65 and the distal end 20.

Figure 1:
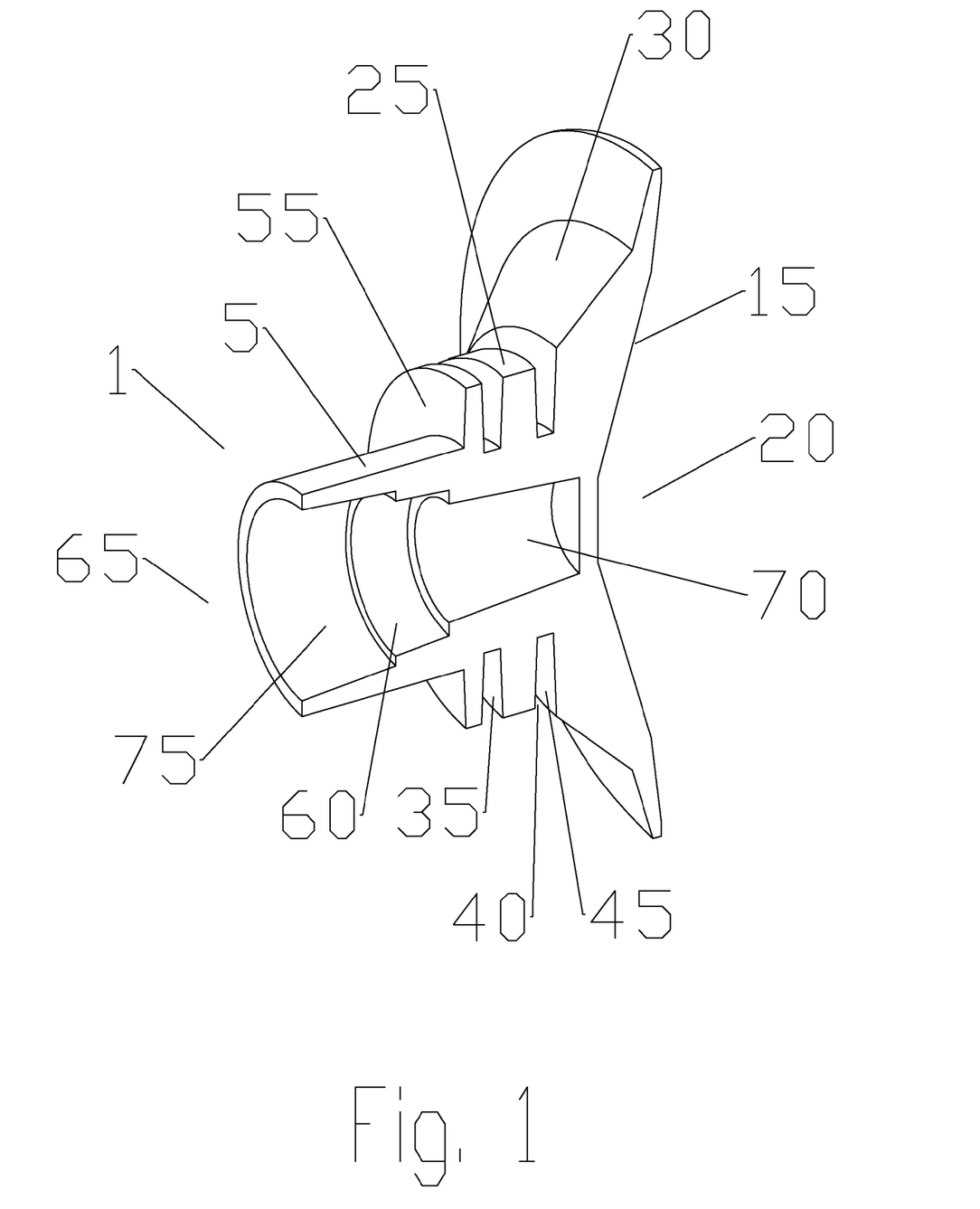
FIG. 1 is a schematic cross-section cut-away side isometric view of an exemplary injection moldable dielectric cone radiator assembly.
Figure 2:
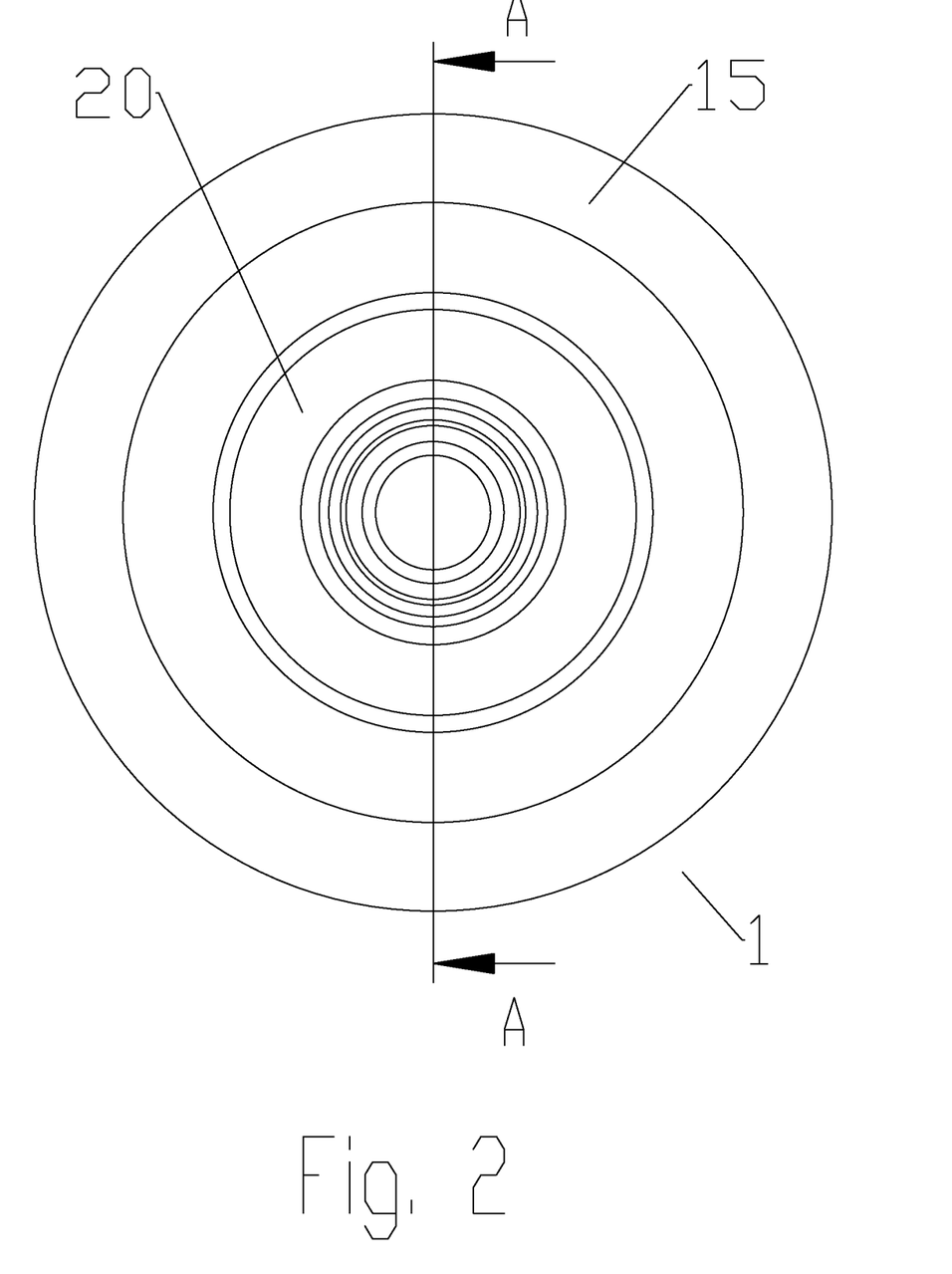
FIG. 2 is a schematic front view of the injection moldable dielectric cone radiator assembly of FIG. 1.
Figure 3:
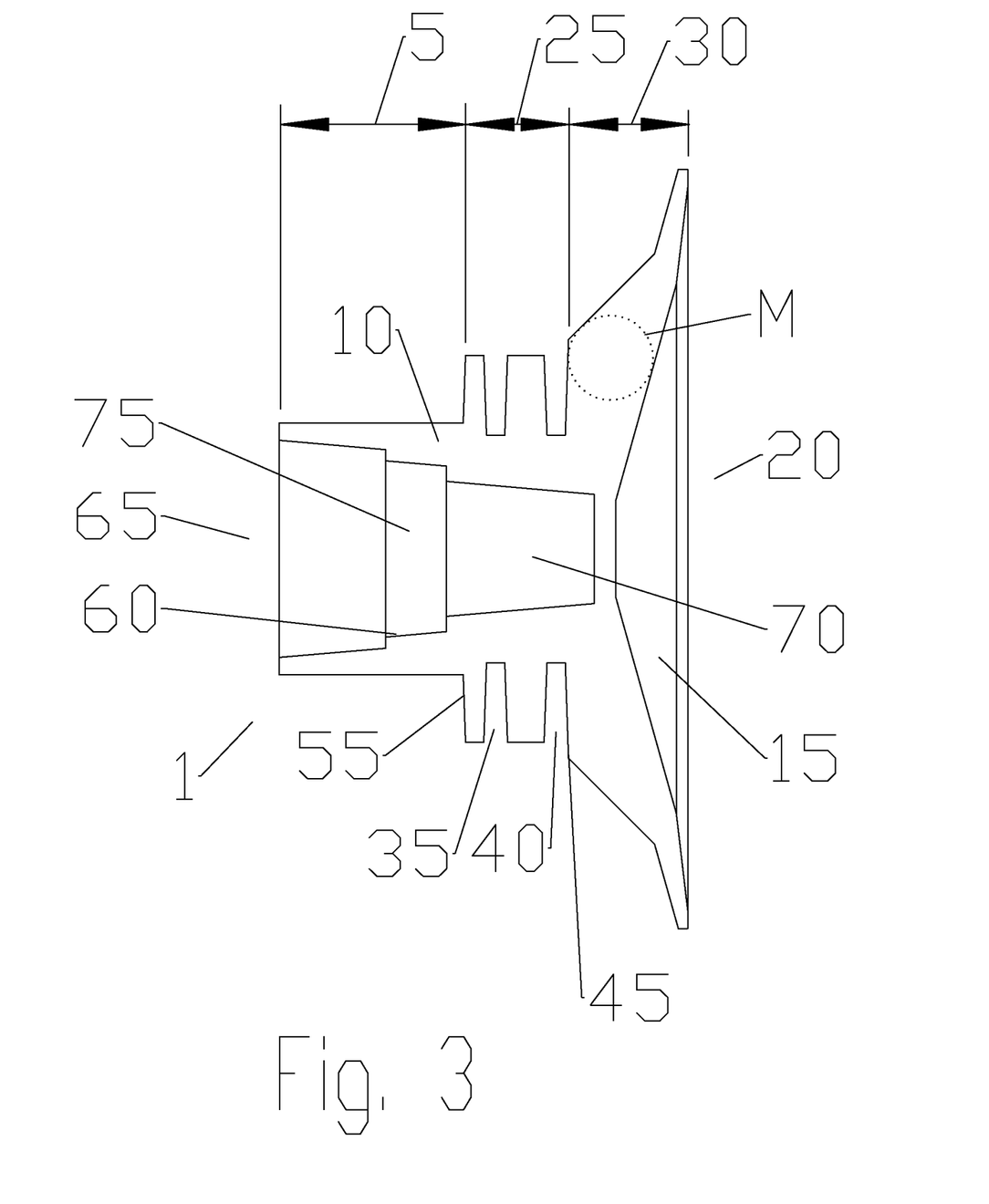
FIG. 3 is a schematic cut-away side view of the injection moldable dielectric cone radiator assembly of FIG. 1, taken along line A-A of FIG. 2.

As best shown in FIG. 3, sub-reflector 15 may be formed by applying a metallic deposition, film, sheet or other RF reflective coating to the distal end 20 of the dielectric block 10. Alternatively, as shown in FIGS. 4 and 6, the sub-reflector 15 may be formed separately, for example as a metal disk 80 which seats upon the distal end of the dielectric block 10. The disk 80 may include a key portion 85 that keys with the lens bore 70 to position the sub-reflector 15 coaxially upon the distal end 20 of the dielectric block 10.

Demonstrated as the largest diameter inscribed circle M possible within the confines of a cross-section of the dielectric block 10, the centerpoint of such a circle is generally the point from which it is farthest to an edge of the dielectric block 10, the maximum material thickness. Thus, the centerpoint is the location where during injection molding of the dielectric block 10, the dielectric material will typically solidify/set last. The maximum material thickness occurs in the current embodiments located between the distal sidewall 45 and the distal end 20. In contrast, the maximum material thickness of prior embodiments of monolithic dielectric block cones is much larger, typically at least the entire inner diameter of the waveguide end. One skilled in the art will appreciate that the combination of the lens bore 70 and the deepened grooves 35 significantly reduces the maximum material thickness of the dielectric block 10, enabling the manufacture of the dielectric block 10 via injection molding with reduced voids, cracks, surface sink, dimensional bends and/or sagging defects. Alternatively, the dielectric block 10 may be manufactured by casting and/or machining which methods similarly benefit from the shallower edge angles and/or number of surface transitions required.

From the foregoing, it will be apparent that the present invention brings to the art a sub-reflector assembly 1 for a reflector antenna with the potiential for significant manufacturing cost efficiencies. The sub-reflector assembly 1 according to the invention are strong, lightweight and may be repeatedly cost efficiently manufactured with a very high level of precision via, for example, injection molding technology.

| Table of Parts | |
|---|---|
| 1 | sub-reflector assembly |
| 5 | waveguide transition portion |
| 10 | dielectric block |
| 15 | sub-reflector |
| 20 | distal end |
| 25 | dielectric radiator portion |
| 30 | sub-reflector support portion |
| 35 | groove |
| 40 | distal groove |
| 45 | distal sidewall |
| 55 | shoulder |
| 60 | step |
| 65 | proximal end |
| 70 | lens bore |
| 75 | impedance transformer |
| 80 | disk |
| 85 | key portion |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A cone radiator sub-reflector assembly for a reflector antenna with a waveguide supported sub-reflector, comprising:
    a unitary dielectric block;
    a sub-reflector provided at a distal end of the dielectric block;
    a waveguide transition portion of the dielectric block dimensioned for insertion coupling into an end of the waveguide;
    a sub-reflector support portion of the dielectric block;
    a dielectric radiator portion between the waveguide transition portion and the sub-reflector support portion; an outer diameter of the dielectric radiator portion provided with a plurality of radially inward grooves; and
    a lens bore extending from a proximal end of the dielectric block towards the distal end of the dielectric block at least to the sub-reflector support portion;

the radially inward grooves extending radially inward to a diameter less than an inner diameter of the end of the waveguide;

a maximum material thickness of the unitary dielectric block occurs between a sidewall of one of the radially inward grooves and the sub-reflector.

2. The sub-reflector assembly of claim 1, further including an inverted impedance transformer provided in the waveguide transition portion.

3. The sub-reflector assembly of claim 1, wherein the bore and the radially inward grooves are tapered.

4. The sub-reflector assembly of claim 1, wherein the sub-reflector is a metal coating upon the distal end of the dielectric block.

5. The sub-reflector assembly of claim 1, wherein the sub-reflector is a separate metal disc seated upon the distal end of the dielectric block.

6. The sub-reflector assembly of claim 1, wherein the lens bore extends through the dielectric block to the distal end.

7. The sub-reflector assembly of claim 1, wherein the plurality of radially inward grooves is two.

8. The sub-reflector assembly of claim 1, wherein an outer diameter of the dielectric radiator portion is provided parallel to a longitudinal axis of the waveguide and the sub-reflector support portion is provided angled outward to a periphery of the dielectric block.

9. A method for manufacturing a cone radiator sub-reflector assembly for a reflector antenna with a waveguide supported sub-reflector, according to claim 1, comprising the steps of:

injection molding the dielectric block; and coupling the sub-reflector to the distal end of the dielectric block.

10. The method of claim 9, wherein the coupling of the sub-reflector is via metal disposition upon the distal end of the dielectric block.

11. The method of claim 9, further including an inverted impedance transformer provided in the waveguide transition portion.

12. The method of claim 9, wherein a maximum material thickness of the unitary dielectric block occurs between a sidewall of one of the radially inward grooves and the sub-reflector.

13. The method of claim 9, wherein the bore and the radially inward grooves are tapered.

14. The method of claim 9, wherein the lens bore extends through the dielectric block to the distal end.

15. The method of claim 9, wherein the plurality of radially inward grooves is two.

16. The method of claim 9, wherein an outer diameter of the dielectric radiator portion is provided parallel to a longitudinal axis of the waveguide and the sub-reflector support portion is provided angled outward to a periphery of the dielectric block.

17. The method of claim 9, wherein the coupling of the sub-reflector is via positioning a separate metallic sub-reflector upon the distal end of the dielectric block.

18. The method of claim 17, wherein the coupling of the sub-reflector includes a key portion of the sub-reflector inserted into a distal end of the lens bore.

19. The method of claim 18, wherein the distal end of the lens bore is tapered towards the distal end of the dielectric block and a proximal end of the lens bore is tapered towards the proximal end of the dielectric block.

\* \* \* \* \*